US007996563B2

(12) United States Patent
Boden (10) Patent No.: US 7,996,563 B2
(45) Date of Patent: *Aug. 9, 2011

(54) METHOD FOR DESIGNATING INTERNET PROTOCOL ADDRESSES

(75) Inventor: Edward B. Boden, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/061,785

(22) Filed: Apr. 3, 2008

(65) Prior Publication Data

US 2008/0183893 A1   Jul. 31, 2008

Related U.S. Application Data

(63) Continuation of application No. 10/323,286, filed on Dec. 18, 2002, now Pat. No. 7,380,021.

(51) Int. Cl.
 *G06F 15/16* (2006.01)
(52) U.S. Cl. ......... 709/245; 709/203; 709/217; 709/226
(58) Field of Classification Search ............... 709/203, 709/217–219, 223, 226–228, 245–246
See application file for complete search history.

(56) References Cited

U.S. PATENT DOCUMENTS

| 6,539,431 | B1 | 3/2003 | Sitaraman et al. |
| 6,560,642 | B1 | 5/2003 | Nurmann |
| 6,769,031 | B1 * | 7/2004 | Bero .............................. 709/245 |
| 6,862,286 | B1 | 3/2005 | Tams et al. |
| 7,002,924 | B2 | 2/2006 | Braun et al. |
| 7,006,499 | B2 | 2/2006 | Tingle et al. |
| 7,027,582 | B2 | 4/2006 | Khelio et al. |
| 7,380,021 | B2 * | 5/2008 | Boden ........................... 709/245 |
| 7,636,790 | B1 * | 12/2009 | Parker et al. ................... 709/245 |
| 2002/0083198 | A1 | 6/2002 | Kim et al. |
| 2003/0204635 | A1 | 10/2003 | Ko et al. |

OTHER PUBLICATIONS

Crawford, Matt,—"IPv6 Node Information Queries", Fermilab, May 2002 (15 pages).
Crocker et al.—"RFC 2234", Demon Internet Ltd., Nov. 1997 (13 pages). http://www.ietf.org/rfc/rfc2234.txt?number=2234.

(Continued)

*Primary Examiner* — Rupal D Dharia
*Assistant Examiner* — Van Kim T Nguyen
(74) *Attorney, Agent, or Firm* — Dennis Jung (57) ABSTRACT

A system and method for selecting one or more real IP6 addresses from a pool of real IP6 addresses in a system. Each of the real IP6 addresses is associated with a physical interface or a virtual physical interface. A human or an application program provides into the system a symbolic IP6 address specifying a physical interface name for the one or more real IP6 address. The system stores the symbolic IP6 address in a configuration file and then passes the symbolic IP6 address to a socket API function. The socket API function checks validity of the symbolic IP6 address. If valid, an operating system function reads a control block or data file for the named physical interface. The control block or data file contains a list of one or more real IP6 addresses for the named physical interface. These real IP6 address(es) are returned to the human or application program.

15 Claims, 3 Drawing Sheets

OTHER PUBLICATIONS

Deering et al.—"RFC 2373", Cisco Systems, Jul. 1998 (24 pages). http://www.ietf.org/rfc/rfc2373.txt?number=2373.
Deering et al.—"IPv6 Scoped Address Architecture", <draft-ietf-ipngwg-scoping-arch-04.txt> (6 pages).
Gilligan et al.—"Basic Socket Interface Extensions for IPv6", Sep. 2002 (34 pages).
National Radio Science Conference, 16th, Cairo, Feb. 23-25, 1999, Proceedings of NRSC 1999.
Digital Technical Journal, vol. 8, Issue 3, Date: 1996, pp. 5-22.
RFC 2460, Internet Protocol, Version 6 (IPv6) Specification, Deering et al., Dec. 1998.
RFC 2461, Neighbor Discovery for IP Version 6 (IPv6), Narten et al., Dec. 1998.
RFC 2462, IPv6 Stateless Address Autoconfiguration, Thomson et al., Dec. 1998.
Internet Draft, Host-Centric IPv6 Multihoning, Huitama et al., Jul. 2001.

* cited by examiner

METHOD FOR DESIGNATING INTERNET PROTOCOL ADDRESSES

CROSS REFERENCE TO RELATED APPLICATION

This application is a Continuation of application Ser. No. 10/323,286, filed Dec. 18, 2002; now U.S. Pat. No. 7,380,021.

FIELD OF THE INVENTION

The invention relates generally to computer systems and deals more particularly with a method for designating an IP6 address for a physical interface of a server or other device on a network.

BACKGROUND OF THE INVENTION

Servers and other devices (i.e. "nodes") on a network need at least one IP addresses in order to be addressed by another device or human connected to the network via the TCP/IP protocol. There are known architectures and formats for IP addresses, usually specified by a standards body (IETF) via a "Request for Comment" ("RFC"). For example, an IP4 (IP version 4) architecture has been known and used for over 20 years, and is the protocol that runs the Internet. This architecture has only thirty two bits for the address and is becoming inadequate as the number of nodes and their applications on the Internet mushroom. A newer, IP6 (IP version 6) architecture has 128 bits and is replacing the IP4 architecture. According to the IP6 architecture, multiple, different IP6 address are common for each physical interface of a node. Typically, the physical interface is the "door" to an application executing on the server or other device. Examples of "physical interfaces" are Ethernet, TokenRing, Wi-Fi (a wireless) and FDDI. If the physical interface supports multiple addressing types, then a separate IP6 address is required for each combination of physical interface and addressing type. There are currently three addressing types—unicast, multicast and anycast. These addressing types indicate one, a group or unlimited recipients, respectively. Also, if the device utilizes more than one internet service provider, then additional IP6 addresses are required. For example, a palm-top computer (which constitutes one node) will most likely have multiple IP6 addresses, one for each of three unicast scopes for a given interface ID. If multiple internet service providers are used, then the number of requisite IP6 addresses will be multiplied accordingly.

Typically, an installer of an internet application on a node specifies the IP address of the application prior or during configuration of the application. Examples of internet applications are web browsers, an email server, an FTP server, a DNS server, etc. Designation of IP6 addresses has proven difficult for the installer due to the complexity of the IP6 architecture, the need in some cases for multiple IP6 addresses, the different types of address, and the multiplicity of IP6 addresses. Also, some components of IP6 addresses can change, dynamically, such as the prefix. Consequently, the affected physical interface dynamically obtains changed IP6 addresses. This can require reconfiguration of many applications and servers that execute on the node.

Accordingly, an object of the present invention is to simplify the process of the installer and system or network administrator designating an IP6 address for a physical interface of a node.

Another object of the present invention is to readily accommodate changes in IP6 addresses due to changes in certain parameters of the node or to changes in assigned IP6 address prefixes.

SUMMARY OF THE INVENTION

The invention resides in a system and method for selecting one or more real IP6 addresses from a pool of real IP6 addresses in a system. Each of the real IP6 addresses is associated with a physical interface or a virtual physical interface. A human or an application program provides into the system a symbolic IP6 address specifying a physical interface name for the one or more real IP6 address. The system stores the symbolic IP6 address in a configuration file and then passes the symbolic IP6 address to a socket API function. The socket API function checks validity of the symbolic IP6 address. If valid, an operating system function reads a control block or data file for the named physical interface. The control block or data file contains a list of one or more real IP6 addresses for the named physical interface.

According to one feature of the present invention the symbolic IP6 address additionally specifies an address type and an address scope for a suitable real IP6 address. The system compares the address type specified in the symbolic address to one or more real IP6 addresses in the pool to determine which of the real IP6 addresses matches the address type. The system compares the address scope specified in the symbolic address to one or more real IP6 addresses in the pool to determine which of the real IP6 addresses matches the address scope.

According to another feature of the present invention, forms that the address type and address scope are specified in the symbolic IP6 addresses are different than forms that the address type and address scope are specified in the matching real IP6 address(es).

DETAILED DESCRIPTION OF THE PREFERRED EMBODIMENTS

Figure 1:
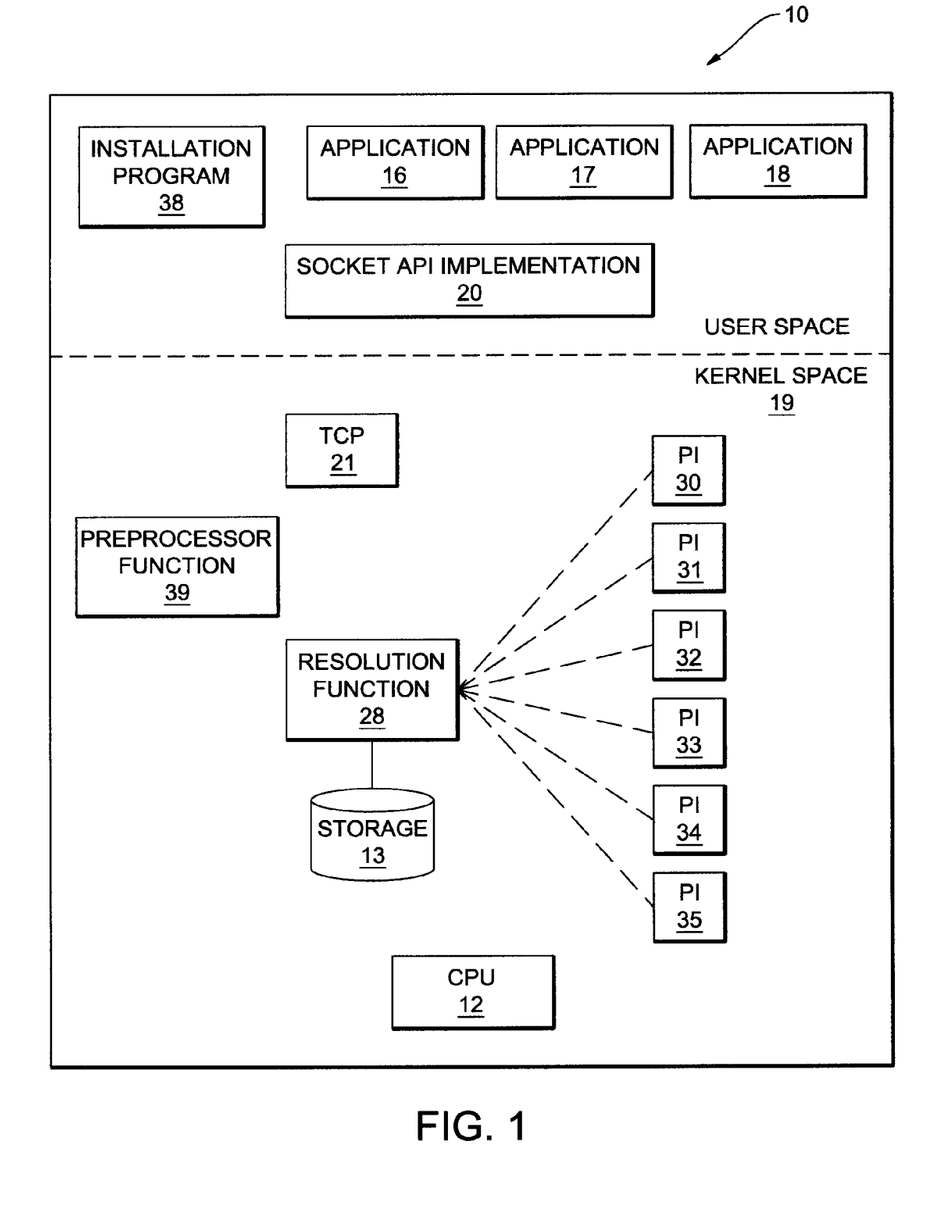
FIG. 1 is a block diagram of a server embodying the present invention.

Referring now to the drawings in detail, wherein like reference numbers indicate like elements throughout, FIG. 1 illustrates a server node generally designated 10 according to the present invention. Node 10 comprises a processor 12, internet application programs 16, 17 and 18 (stored in RAM not shown) and an operating system 19 (also stored in the RAM). By way of example, internet program 16 is a web browser, internet program 17 is e-mail server and internet program 18 is SNMP agent although many other internet programs are supported by the present invention as well such as an FTP server application and a CIMMOM server application. Server node 10 also includes a socket API function 20 which participates in resolving a symbolic IP6 address into one or more real IP6 address. Server node 10 also includes a known TCP transport function 21 for the TCP/IP internet application(s). (Note that the current invention is independent of the transport protocol which is used. Although only TCP is shown, the present invention functions equally well for UDP or SCTP, and likely future to-be-determined transport protocols.) Server node also includes an IP6 resolution program 28 in storage 13 which, as described below, completes the resolution of a symbolic IP6 address into one or more real IP6 addresses. Server node 10 also includes physical interfaces 30-35 for the internet. By way of example, each of the physical interfaces is an Ethernet adapter although many other internet connections such as Wi-Fi wireless, TokenRing and FDDI are supported by the present invention as well. In general, the current invention applies to any physical device supported by an implementation of the IP6 protocol. Control blocks (not shown) within the operating system represent the physical interfaces. The real IP6 addresses logically represent each of the physical interfaces, in a many-to-one relation. The real IP6 address could also be associated with a virtual physical interface.

Application 16 was installed and configured as follows. First, application 16 was loaded into the RAM. Then, an installation program/"wizard" 38 is activated. Installation program 38 queries the human installer to enter either a symbolic IP6 address or a real IP6 address, if known. This address will be associated with a physical interface and will be the IP6 address by which the application program 16 can be reached. If the installer enters either type of IP6 address, then it is saved into a configuration file. If the installer enters a real IP6 address, then the present invention for resolving symbolic IP6 addresses to real IP6 addresses is not needed or used. However, if the installer enters a symbolic IP6 address, that is the address which is later resolved into one or more real IP6 addresses according to the present invention as described below. If the installer enters neither a symbolic IP6 address nor a real IP6 address, then there should be a default symbolic IP6 address within application 16 as written. That default address will be resolved into a real IP6 address according to the present invention as described below. The real IP6 address, when resolved, will be used to send and receive packets; the symbolic IP6 address cannot as it will only be known within server node 10. In addition to using the symbolic IP6 address for configuration, the symbolic IP6 address can be used later by a human operator on a command line, by the application program 16 during startup, or by humans in Perl scripts, instead of a real IP6 address.

The symbolic IP6 address comprises multiple fields that may uniquely specify the physical interface and other addressing components, i.e. physical interface, address type, address scope, interface identifier and zone identifier.

The physical interface name indicates the type of physical connection such as Ethernet, Wi-Fi wireless, TokenRing or FDDI. In the preferred embodiment of the present invention, the physical interface specified in the symbolic IP6 address is the name used by the native operating system for the physical interface. All operating systems have some conventional way of naming physical interfaces via text strings with a limit to the number of characters and type of characters which are used in the name. For example, the Windows operating system may name an Ethernet connection as "ETH1", "ETH2" and a TokenRing connection as "TOKENRING0A". A UNIX operating system may name an Ethernet connection as "ETH1" or "LN0". Note that some operating systems allow configuration of physical interface names by the administrator; hence the names may use other administrative conventions. Because the IP6 resolution program 28 resides in the node where the application configuration occurs, it is able to obtain the text string for the native operating system physical interface names, from the operating system. The inclusion of the physical interface, or an '*' (wild card) indicating all physical interfaces, in the symbolic IP6 address is required.

The addressing type indicates whether the communication is intended for one recipient in the case of "unicast", a group or recipients in the case of "multicast" or all connected recipients in the case of "anycast". In one embodiment of the present invention, the specification of the addressing type in the symbolic IP6 address is "UC" for unicast, "MC" for multicast and "AC" for anycast. This field is optional, and if empty, the addressing type is deemed to be "unicast" by default.

The address scope indicates the domain in which the address needs to be unique such as globally, site-wide or local within the LAN (termed "link-local"). In one embodiment of the present invention, the specification of the address scope in the symbolic IP6 address is the character string "GLOBAL", "SITE", "LOCAL", respectively. Alternately, the address scope can be a decimal number that corresponds to one of the fourteen defined scope designations (which include the named scopes). These fourteen scope designations are defined by RFC2373. However, other character strings would suffice as well. The inclusion of the address scope in the symbolic IP6 address is optional.

The interface identifier indicates the media access control ("MAC") address of the physical interface. A MAC address is used for identifying physical devices at the physical layer ("Layer One"). In the preferred embodiment of the present invention, the specification of the interface identifier in the symbolic IP6 address is the MAC address or a sixty four bit interface identifier. The "interface identifier" can be made optional, but to avoid ambiguity, a ':' separator following it (if included) is not optional. The inclusion of the interface identifier in the symbolic IP6 address is optional.

The zone ID indicates a zone of scope of the IP6 address. For example, an IP6 node may be in multiple non-overlapping instances of the same scope, and these are distinguished by zoneid. The zone ID can be used in sockaddr_in6::sin6_scope_id socket struct field. The inclusion of the zone ID is optional and its format is specified in IETF "IPv6 Scoped Address Architecture" draft (draft-ietf-ipngwg-scoping-arch-04.txt). (IETF RFCs and drafts are available at www.ietf.org.)

All of the foregoing parts of the symbolic IP6 address are combined serially, with a colon separating each part:

<interface name>:<type>:<scope>:<interface identifier>:%<zoneid>

For any of the foregoing parts, an asterisk may be used as a "wildcard" to designate "any".

The following is an ABNF grammar that defines a syntax for the symbolic IP6 addresses including the foregoing parts. However, this ABNF grammar is only a specific example of a suitable grammar, and variations exist which could also be used; some of these variations are suggested by the comments within the grammar. The ABNF is defined in RFC 2234 "Augmented BNF for Syntax Specifications: ABNF" (an IETF 'standards track' RFC). Some of the 'Core rules' defined in 6.1 of RFC2234 are used. ABNF strings (enclosed in " . . . ") are case insensitive. Comments begin with ';' and continue to the end-of-line.

```
; -- start abnf --
iP6-symaddr-      =   interface-name-   separator-
                      [type-indicator-  separator-]
                      scope-indicator-  separator-interface-id-
                      [zone-indicator-]
                      ;interface name is optional because for
                      ;convenience on systems with only one
                         interface.
                      ;type indicator is optional because a
                         default
                      ;of unicast is reasonable.Zone identifier
                      ;optional because reasonable defaults can
                      ;be assumed.
interface-name-   =   ALPHA *(ALPHA / DIGIT / "-")
                      ; start with alpha, then 0 or more alpha,
                      ; digit or -
type-indicator-   =   unicast- / multicast- / anycast-
scope-indicator-  =   named-scope- / numeric-scope-
interface-id-     =   "mac"/ %x0000000000000000-ffffffffffffffff
                      / ip4-
                      ; use mac address for the interface or
                      ; up to 64 bits of hex. When 32 bits are
                         given
                      ; they are right-justified in the
                         low-order
                      ; 64 bits, preceded with 32 0 bits.
named-scope-      =   global- / site- / local-
numeric-scope-    =   %x01-14
                      ; used to support mc scope (scopes 0x00 &
                      ; 0x15 are reserved)
ip4-              =   dottedip4- / %x000000-ffffff
dottedip4-        =   %d0-255 "." %d0-255 "." %d0-255 "."
                      %d0-255
zone-indicator-   =   '%' zoneid-
unicast-          =   "uc" / "unicast"
multicast-        =   "mc" / "multicast"
anycast-          =   "ac" / "anycast"
global-           =   "g" / "gl" / "gbl" / "global" / %x14
                      ; other abbreviations are possible
site-             =   "s" / "site" / %x5
local-            =   "l" / "local" / %x2
zoneid-           =   %d
                      ; a specific OS may place bounds on
                         values
                      ; allowed, or may elect to allow a
                         different
                      ; type of zoneid.
separator-        =   ":"
; -- end abnf --
```

The following are examples of symbolic IP6 addresses:

a) ETH1:GLOBAL:MAC—designates 1st global unicast address on ETH1 that uses the line's MAC address for its interface identifier.
b) ETH1:SITE:*—designates all the site-local unicast addresses on ETH1.
c) LN1:MC:LOCAL:4—designates the multicast address on LN1 with link-local scope and interface id=4.
d) LN1:MC:4:4—designates the same multicast address as above (LOCAL scope=4).
e) :SITE:MAC %4—any unicast site-local using the MAC address (there should be 0 or 1) in zoneid 4. (Note the absent interface name and type.)

The following are examples of real IP6 addresses, represented in architected, hexadecimal text form rather than binary form. These real IP6 addresses correspond respectively to the foregoing symbolic IP6 addresses in a physical node where there are three Ethernet adapters—Eth1, Eth2 and Eth3. The architecture of the real IP6 addresses is specified in RFC 2373 (sections 2.2 & 2.3 of RFC 2373 define the text form for IP6 addresses).

a) 2003:0:0:0:0:0:14a:3a01
b) fec0:0:0:0:0:0:14a:3a01, fec0:0:0:0:0:0:0:1
c) ff02::4
d) ff02::4
e) fec0::c0d6:fa3, fec0::2, fec0::a:201d (Under the convention of the architecture, leading zeros can be omitted. Also, it is permissible to collapse a series of groups of four hexadecimal "0" digits as "::". The reader knows how many groups of hexadecimal "0" digits are represented by the "::" because the architecture always has eight groups of four hexadecimal digits per real IP6 address.)

The following is an explanation of which parts/parameters of the symbolic IP6 address can be derived from the real IP6 address or its associated logical interface control block:

There is no part of the real IP6 address that corresponds to the physical interface part of a symbolic IP6 address. Nevertheless, the physical interface part of the symbolic IP6 address is used in the present invention (in step 70 of FIG. 3) to identify all the real IP6 addresses for the physical interface specified in the symbolic IP6 address. This reduces the number of real IP6 address candidates that may possibly satisfy the entire symbolic IP6 address. All the real IP6 addresses for each physical interface are maintained in a collection of logical interface control blocks associated with the physical interface.

The real IP6 addresses can indicate "multicast" address type by beginning with eight binary one bits, i.e. 0XFF as the first group of four hexadecimal digits. So, if a symbolic IP6 address indicates "multicast", a corresponding real IP6 address would begin 0XFF. The real IP6 addresses that begin otherwise are either "unicast" or "anycast"; the RFC2373 architecture does not have a syntactical distinction between "unicast" or "anycast". Nevertheless, there is capability in system 10 to distinguish between "unicast" and "anycast" in its real IP6 addresses. The logical interface control block (termed curr6ifc in the pseudo-code below) will include an "anycast" flag if applicable. Absent, the "anycast" flag, the real IP6 address is "unicast".

The real IP6 address can indicate scope as follows. If the real IP6 address is "multicast" address type, then its scope is indicated by bits thirteen through sixteen, i.e. the last four bits of the first sixteen bits from the left. If the real IP6 address is not "multicast", then it must be "link-local", "site-local" or "global". This is indicated by the first ten bits of the real IP6 address, i.e. 0XFE80 is "link-local", 0XFEC0 is "site-local". All other values are global scope.

The real IP6 address includes an interface identifier in its rightmost sixty four bits. The interface identifier in the symbollic IP6 address is assumed to be/expanded to sixty four bits even if provided as less than sixty four bits, for example, "1" or "9.130.2.3".

The architecture of the real IP6 address does not indicate a zone identifier. However, (if specified in the symbolic IP6 address), this is provided in the logical interface control block for the real IP6 address.

The grammar of the symbolic IP6 address differs from the grammar of corresponding real (text form) IP6 addresses as follows:

The symbolic form allows specification of a physical interface, while the text form does not.

The symbolic form allows resolution to multiple real IP6 addresses, while the text form does not.

The symbolic form allows names for IP6 address types (unicast, multicast, anycast), while the text form does not.

The symbolic form allows selection of an IP6 address with an interface identifier equal to its physical interface MAC address without knowing the MAC address value, while the text form does not.

The symbolic form allows names for address scope, while the text form does not.

The symbolic form allows embedded IP4 addresses to be expressed as dotted decimal or binary, while the text form does not.

The symbolic form allows for the specification of one or more IP6 addresses without knowing their actual value, while the text form does not.

Also, the form of the components in the symbolic IP6 address differs from the text form of real IP6 addresses as follows:

The symbolic form has components that use the full range of alphabetic characters, which the text form does not.

The symbolic form expresses components that are not hexadecimal or decimal value, while the text form does not.

The symbolic form allows the specification of physical interface names, while the text form does not.

After the symbolic IP6 address was entered by the human installer or obtained from the default settings of application program 16, server node 10 will start and then attempt to configure the application program 16, i.e. identify an appropriate real IP6 address. The function to resolve the symbolic IP6 address will later be called by application program 16. So, the installation program 38 fetches the name of the resolution function and incorporates it into application program 16. One implementation of this function of installation program 38 in C language as a "method prototype" is as follows:

include symbolic_in6.h

This step directs the C preprocessor to fetch the code named "symbolic_in6.h" and insert it into program 16 before passing the program to the compiler. This code to be fetched includes the following API name "sym6toin6_add" of the resolution function 28 used to resolve the symbolic IP6 address into one or more real IP6 addresses:

in6_addr *sym6toin6_addr(char *sym6addr, int selectstatus, int *n );

The first parameter is input, and contains the symbolic address to be resolved. The second parameter is input and contains a coded value to indicate whether active IP6 addresses or inactive or either should be returned. The third parameter is output and contains the number of addresses returned. If no IP6 addresses are found, a null is returned and third parameter is set to 0.

The following pseudo-code shows how the application program 16 might use the sym6toin6_addr( ) function. This would be done during the startup of application program 16. During startup, application program would read its configuration file, in which the symbolic IP6 address is stored. Application program 16 would read the symbolic IP6 address and then resolve it as illustrated as follows:

```
...
// application program 16 has read the symbolic ip6 address
and
   // stored it in a variable called 'mysymaddress'...
   //
   // next, it resolves it to 1 or more ip6 addresses...
   int numaddr;
   in6_addr *ip6addrlist = sym6toin6_addr( mysymaddr, ACTIVE, &numaddr );
   if (!ip6addrlist) { /* handle error condition */ ... }
   //
   // now, open a socket for each ip6 address returned...
   in6_addr *addr = ip6addrlist;
   for ( int i=1; i<=numaddr; ++i )) {
      // create a socket for 'addr', as usual ...
      addr = ++ip6addrlist;
   // get next ip6 address
   }
   //
   // continue initialization, as usual ...
...
```

Figure 2:
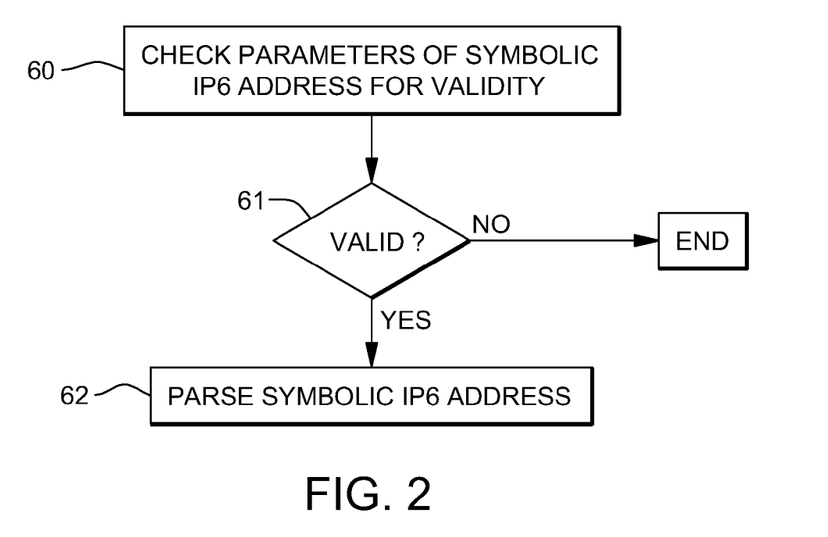
FIG. 2 is a flow chart illustrating part of an address resolution function within the server of FIG. 1.

Next, application program 16 passes the symbolic IP6 address to the socket API function 20 within the operating system. Optionally, the installer or application program 16 can pass an additional parameter to the socket API function to specify a requisite status of real IP6 addresses into which the symbolic IP6 address should be resolved. The status include preferred, deprecated, active or any status. "Preferred" is an IP6 architected attribute. "Deprecated" is another IP6 architected attribute; there can be multiple real IP6 addresses that are "deprecated". "Active" is a superset IP6 architected attribute that encompasses "preferred" and "deprecated". In response, the socket API function 20 performs the following steps (which are also illustrated in FIG. 2):

Step 60: The socket API function checks parameters for validity, i.e. checks the syntax of the symbolic IP6 address and checks the value of the status selection parameter to determine if it is a valid value. The status selection parameter is usually "active" or "inactive". This step involves the ABNF grammar. Through existing, well known means the socket API function generates/derives code which parses the symbolic IP6 address, and detect errors, if any. If any error occurs, it will return appropriate return code via errno, null via entry-point.

Step 62: If the parameters are valid (decision 61), the socket API function then parses the symbolic IP6 address into an internal struct, i.e. parsed form according to C/C+. Having successfully parsed the symbolic IP6 address in the previous step, the appropriate parts are copied to the following struct (e.g. stored in memory in this form):

```
struct sym6addr {
   short int   status;
   char        *ifcname;
   short int   type,
               scope,
               zone;
   int         ifcid;      // 64-bit int assumed
};
```

The in6_addr struct provided by the parsing method is defined in various levels of IETF draft "Basic Socket Interface Extensions for IPv6"; draft-ietf-ipngwg-rfc2553bis-07.txt, dated September 2002, is the latest.

Figure 3:
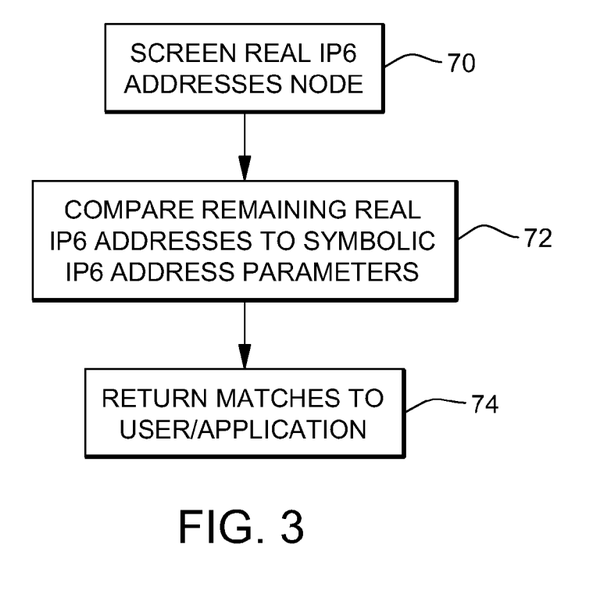
FIG. 3 is a flow chart illustrating another part of the address resolution function within the server of FIG. 1.

Assuming there were no outright errors in parameter validity or parsing, the Socket API function then calls resolution function 28 of the TCP/IP stack (typically implemented in the OS kernel) via lower-level entry-points. In response, the resolution function 28 performs the following steps as illustrated in FIG. 3:

Step 70: The resolution function 28 determines boundary conditions for the real IP6 addresses for the interface specified in sym6addr::ifcname, or all the physical interfaces supporting IP6, if sym6addr::ifcname is null. By specifying the "boundary" interface, this limits the real IP6 addresses that may possibly correspond to the symbolic IP6 address. The boundary interface was derived from the physical interface component of the symbolic IP6 address. This was revealed in the parsing of step 62. All of the binary real IP6 addresses that result from this step, either the ones conforming to the "boundary" condition in the case where the interface is named or all the binary real IP6 addresses contained in storage in the case where the interface is not named will later be subject to another test to determine if they correspond to the symbolic IP6 address. A 'return address list' (a buffer in memory) is initialized to null.

Figure 4:
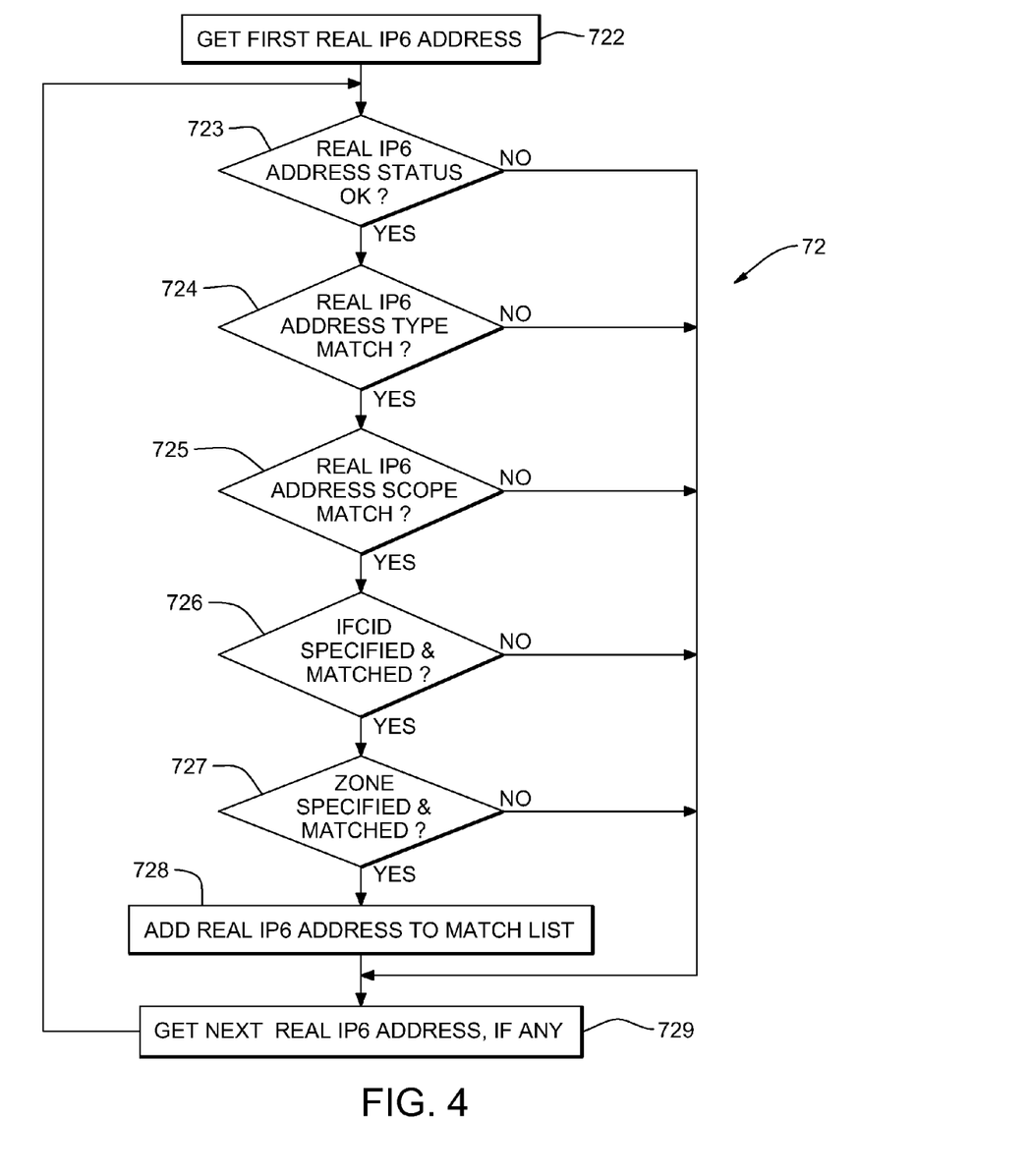
FIG. 4 is a flow chart illustrating more detail of the part of the address resolution function illustrated in FIG. 3.

Step 72: Each existing "real" IP6 address that results from step 70 is checked to see if it matches the entire sym6addr (the symbolic IP6 address). Step 72 is further illustrated in the flow chart of FIG. 4:

In step 722, the resolution function 28 fetches the first binary IP6 address that resulted from step 70, i.e. is contained within the specified boundary, if any. Next, the resolution function confirms that the address status of the first real IP6 address complies with that which was optionally provided by the installer or application program, i.e. preferred, deprecated, active or any status (step 723). If not, the resolution function "discards" this first real IP6 address, and fetches the next real IP6 address (steps 729 and 722). However, if the address status matches or if none was specified, then the resolution function 28 compares the address type of the first real IP6 address to that in the symbolic IP6 address (step 724). If the address type does not match, the resolution function "discards" this first real IP6 address, and fetches the next real IP6 address (steps 729 and 722). However, if the address type matches, the resolution function next compares the symbolically designated address scope with the real, binary IP6 address scope (step 725). If they do not match, then the resolution function "discards" this first real IP6 address, and fetches the next real, binary IP6 address (steps 729 and 722). However, if they match, then the resolution function next compares the interface identifier ("IFCID") symbolically designated with the interface identifier of the real, binary IP6 address (step 726). If they do not match, then the resolution function "discards" this first real IP6 address, and fetches the next real IP6 address (steps 729 and 722). However, if they match, then the resolution function next compares the zone specified in the symbolically designated IP6 address to the zone of the real, binary IP6 address (step 727). If they do not match, then the resolution function "discards" this first real IP6 address, and fetches the next real IP6 address (steps 729 and 722). However, if they match, then the resolution function adds the real, binary IP6 address to the "match" list as being a resolution of the symbolic IP6 address (step 728). Then, the resolution function repeats steps 722-728 for the next real IP6 address, if any, in the boundary pool that resulted from step 70.

Step 72 can be implemented, by way of example, by the following (C++) pseudo code. The following pseudo code fragment assumes sym6 is the symbolic IP6 address requested (as a struct sym6addr) and curr6ifc is an internal struct representing an IP6 logical interface.

```
...
// ck each ip6 address for possible addition to matching
//list via this logic...
//
if ( curr6ifc.status != sym6->status) continue;
if ( IS_MULTIADDR6(curr6ifc.ip6addr) && sym6->type != MC )
continue;
if (sym6->type == AC && !curr6ifc.anycast ) continue;
if ( IS_LINKLADDR6(curr6ifc.ip6addr) && sym6->scope !=
LINKLOCAL ) continue;
if ( IS_SITELADDr6(curr6ifc.ip6addr) && sym6->scope !=
SITELOCAL ) continue;
if ( (IS_MULTIADDR6(curr6ifc.ip6addr) && sym6->type == MC))
   {//extract mc scope
       int addrscop = UPPER64(curr6ifc.ip6addr) &
       0x00f0000000000000000;
       if ( addrscop !=sym6->scop ) continue; }
if ( sym6->ifcid != 0 && sym6->ifcid !=
LOWER64(curr6ifc.ip6addr) )
   continue;
if ( sym6->zone != 0 && sym6->zone != curr6ifc.zoneid )
continue;
matchinglist.add( curr6ifc.ip6addr );
// (bottom of loop)
...
```

Step 74: A copy of each real IP6 address that matches the symbolic IP6 address is placed in the return address list. The list of matching addresses is returned to user space, then via the socket API, to the calling program. Zero addresses will be returned for the case where no appropriate real IP6 address is found on the local system. The application program 16 will be programmed to handle such situations. If one real IP6 address is returned, the application or installer can choose to use it or manually enter another real IP6 address. If more than one real IP6 address is returned, the application or installer can choose one from amongst them or manually enter another real IP6 address.

The foregoing technique for identifying a real IP6 address has been described where the internet application and the resolution function 28 reside within the same server; however, the present invention is not so limited. The present invention can be extended to allow identification of real IP6 addresses for a physical interface that is not in the same server where the symbolic IP6 address is furnished (by the human installer or internet application). The symbolic IP6 address could then be sent to a remote node, resolved there, and the resulting real (binary) IP6 addresses returned. Such a query made to the remote node for these addresses could be added, for example, to the existing Node Information Query (draft-ietf-ipngwg-icmp-name-lookups-09.txt).

The invention claimed is:

1. A computer program product for selecting one or more real IP6 addresses from a pool of real IP6 addresses in a system, each of said real IP6 addresses being associated with one or more physical interfaces, said program product comprising:

a computer readable storage non-transitory medium;

first program instructions for receiving from a human or an application program a symbolic IP6 address specifying (a) a name of a physical interface or an identifier for a physical interface, (b) an address type and (c) an address scope; and second program instructions, responsive to said physical interface name being specified in said symbolic address, to read a control block or data file maintained by said system for the named physical interface, said control block or data file containing a list of one or more real IP6 addresses for said named physical interface, said second program instructions being responsive to said interface identifier being specified in said symbolic address, to compare said interface identifier to one or more real IP6 addresses in said pool to determine which of said real IP6 addresses in said pool match(es) said physical interface identifier; and third program instructions to compare said address type specified in said symbolic address to one or more real IP6 addresses in said pool to determine which of said real IP6 addresses in said pool matches said address type; and fourth program instructions to compare said address scope specified in said symbolic address to one or more real IP6 addresses in said pool to determine which of said real IP6 addresses in said pool matches said address scope;

fifth program instructions, responsive to (a) said second program instructions reading said control block data file or comparing said interface identifier, (b) said third program instructions comparing said address type, and (c) said fourth program instructions comparing said address scope, to designate for said named or identified physical interface one or more real IP6 addresses such that a subsequent message addressed to said one or more real IP6 addresses designated for said named physical interface will be forwarded to said named physical interface; and wherein said first, second, third, fourth and fifth program instructions are stored on said a computer readable storage non-transitory medium.

2. A computer program product as set forth in claim 1 wherein forms in which the address type and the address scope are specified in said symbolic IP6 addresses are different than forms in which an address type and an address scope are specified in the matching real IP6 address(es).

3. A computer program product as set forth in claim 1 wherein a form of said physical interface name specified in said symbolic IP6 address is a form architected by an operating system in said system.

4. A computer program product as set forth in claim 1 wherein a form of said physical interface identifier specified in said symbolic IP6 address is different than a form of physical interface identifier specified in the matching real IP6 address(es).

5. A computer program product as set forth in claim 1 further comprising sixth program instructions, responsive to said address type specified in said symbolic IP6 address not being multicast, to check said control block or data file for an indication of anycast for one or more of said real IP6 addresses; and wherein said sixth program instructions are stored on said computer readable storage non-transitory media.

6. A computer program product as set forth in claim 1 further comprising sixth program instructions, responsive to said address scope specified in said symbolic IP6 address being multicast, to check certain bits of said one or more real IP6 addresses in said pool for matching scope, and if said address scope specified in said symbolic IP6 address is not multicast, to check other bits of said one or more real IP6 addresses in said pool for matching scope.

7. A computer program product as set forth in claim 1 wherein said symbolic IP6 address further specifies a zone identifier, and further comprising sixth program instructions to compare said zone identifier specified in said symbolic IP6 address to zone identifiers in said control block or data file for said one or more real IP6 addresses in said pool; and wherein said sixth program instructions are stored on said computer readable storage non-transitory media.

8. A computer program product as set forth in claim 1 wherein said human or application program also specifies a requisite status of matching real IP6 addresses, and further comprising sixth program instructions to check said status of said one or more IP6 addresses in said pool to match said status; and wherein said sixth program instructions are stored on said computer readable storage non-transitory media.

9. A computer program product as set forth in claim 8 wherein said status comprise preferred, deprecated and active.

10. A computer program product as set forth in claim 1 wherein said address type and address scope specifications are default parameters of said application program.

11. A computer program product as set forth in claim 1 wherein said symbolic IP6 address is written into a configuration file and passed by said application to an operating system for configuration.

12. A computer program product as set forth in claim 1 further comprising:

sixth program instructions to receive a message addressed to one of said one or more real IP6 addresses which match (a), (b) and (c), and in response, forward to said physical interface said message addressed to one of said one or more real IP6 addresses which match (a), (b) and (c); and wherein said sixth program instructions are stored on said computer readable storage non-transitory media.

13. A method for selecting one or more real IP6 addresses from a pool of real IP6 addresses in a system, each of said real IP6 addresses being associated with a physical interface, said method comprising the steps of:

providing by a human or an application program into said system a symbolic IP6 address specifying a name of a physical interface, an address type and an address scope, said system passing said symbolic IP6 address to a socket API function; and said socket API function checking validity of said symbolic IP6 address, and if valid, an operating system function reading a control block or data file for the named physical interface, said control block or data file containing a list of said one or more real IP6 addresses for said named physical interface, determining which of said one or more real IP6 addresses in said list for said named physical interface matches said address type and said address scope, and returning to said human or application program said one or more real IP6 addresses from said list which match said address type and said address scope, wherein said symbolic IP6 address is different than each of said one or more real IP6 addresses returned to said human or application program.

14. A computer program product for selecting one or more real IP6 addresses from a pool of real IP6 addresses in a system, each of said real IP6 addresses being associated with a physical interface, said computer program product comprising:

one or more computer readable storage non-transitory media;

socket API program instructions;

an operating system program function; and first program instructions to receive from a human or an application program a symbolic IP6 address specifying a name of a physical interface, an address type and an address scope, said system passing said symbolic IP6 address to said socket API program instructions; and wherein said socket API program instructions check validity of said symbolic IP6 address, and if valid, said operating system program function reads a control block or data file for the named physical interface, said control block or data file containing a list of said one or more real IP6 addresses for said named physical interface, determines which of said one or more real IP6 addresses in said list for said named physical interface matches said address type and said address scope, and returns to said human or application program said one or more real IP6 addresses from said list which match said address type and said address scope;

said symbolic IP6 address is different than each of said one or more real IP6 addresses returned to said human or application program; and said first program instructions, said socket API program instructions and said operating system program function are stored on said one or more computer readable storage non-transitory media.

15. A system for selecting one or more real IP6 addresses from a pool of real IP6 addresses in said system, each of said real IP6 addresses being associated with a physical interface, said system comprising:

a central processing unit;

means for receiving from a human or an application program a symbolic IP6 address specifying a name of a physical interface, an address type and an address scope, and passing said symbolic IP6 address to a socket API function means; and said socket API function means checking validity of said symbolic IP6 address; and means, operative if said symbolic IP6 address is valid, for reading a control block or data file for the named physical interface, said control block or data file containing a list of said one or more real IP6 addresses for said named physical interface, determining which of said one or more real IP6 addresses in said list for said named physical interface matches said address type and said address scope, and returning to said human or application program said one or more real IP6 addresses from said list which match said address type and said address scope for use in determining subsequent incoming messages that should be forwarded to said named physical interface, wherein said symbolic IP6 address is different than each of said one or more real IP6 addresses returned to said human or application program; and wherein said receiving and passing means, said socket API function means, and said reading, determining and returning means are stored in said system for execution by said central processing unit.

* * * * *